United States Patent [19]
Gleasman

[11] 3,884,096
[45] May 20, 1975

[54] FLOATING JOURNAL PIN IN MULTIPLE GEAR DIFFERENTIAL

[76] Inventor: Vernon E. Gleasman, 3808 Kirkwood Rd., Cleveland Heights, Ohio 44121

[22] Filed: July 18, 1972

[21] Appl. No.: 272,800

[52] U.S. Cl. ............................................ 74/715
[51] Int. Cl. ............................................ F16h 1/38
[58] Field of Search ............ 74/715, 714, 710, 713; 85/8.3

[56] References Cited
UNITED STATES PATENTS

| | | | |
|---|---|---|---|
| 1,273,957 | 7/1918 | Ungar | 74/715 |
| 1,352,910 | 9/1920 | Ormsby | 74/715 |
| 1,544,363 | 6/1925 | Alden | 74/713 |
| 2,022,141 | 11/1935 | Morgan | 74/715 |
| 2,070,569 | 2/1937 | Asam | 74/715 |
| 2,578,155 | 12/1951 | Slider | 74/713 |
| 2,737,843 | 3/1956 | Koehl | 85/8.3 UX |
| 2,900,846 | 8/1959 | Lehman | 74/714 |
| 3,057,226 | 10/1962 | Blomberg | 74/713 |
| 3,227,030 | 1/1966 | Preziosi et al. | 85/8.3 X |
| 3,557,402 | 1/1971 | Koehl | 85/8.3 X |

FOREIGN PATENTS OR APPLICATIONS

| | | | |
|---|---|---|---|
| 700,661 | 12/1940 | Germany | 74/715 |

*Primary Examiner*—Arthur T. McKeon
*Attorney, Agent, or Firm*—George S. Baldwin et al.

[57] ABSTRACT

This invention is described in connection with a preferred differential gear mechanism utilizing two substantially identical gear sets. Each set has a central worm or traction gear, sometimes called a side gear, adapted to be keyed to one of the driven shafts leading either to a drive wheel of an automotive vehicle; or, in a transfer case, one driven shaft leads to a front axle and the other to a rear axle of a four-wheel drive vehicle. Each of these side gears is in mesh with a plurality of transfer gear complexes, in the present case there being three, each complex having located centrally thereof a worm wheel in mesh with the side gear and having a reversible balancing gear at each end of the worm wheel. In use, the balancing gears in one set are in mesh with the balancing gears of the other set. The present invention provides a generally cylindrical pin long enough to enter into receiving bores in the case housing the two gear sets in final assembly whereby, if the housing is in two halves, the pin acts as a dowel pin and constitutes a press fit during assembly of the parts. In different embodiments, each of the gear complexes has an axial pin about which it rotates, and this axial pin extends into the associated case portion in which it rotates on each side of the transfer gear complex. The pin of this invention is so positioned that it prevents endwise movement of such a shaft in one direction at least, while permitting free rotation of said shaft.

5 Claims, 6 Drawing Figures

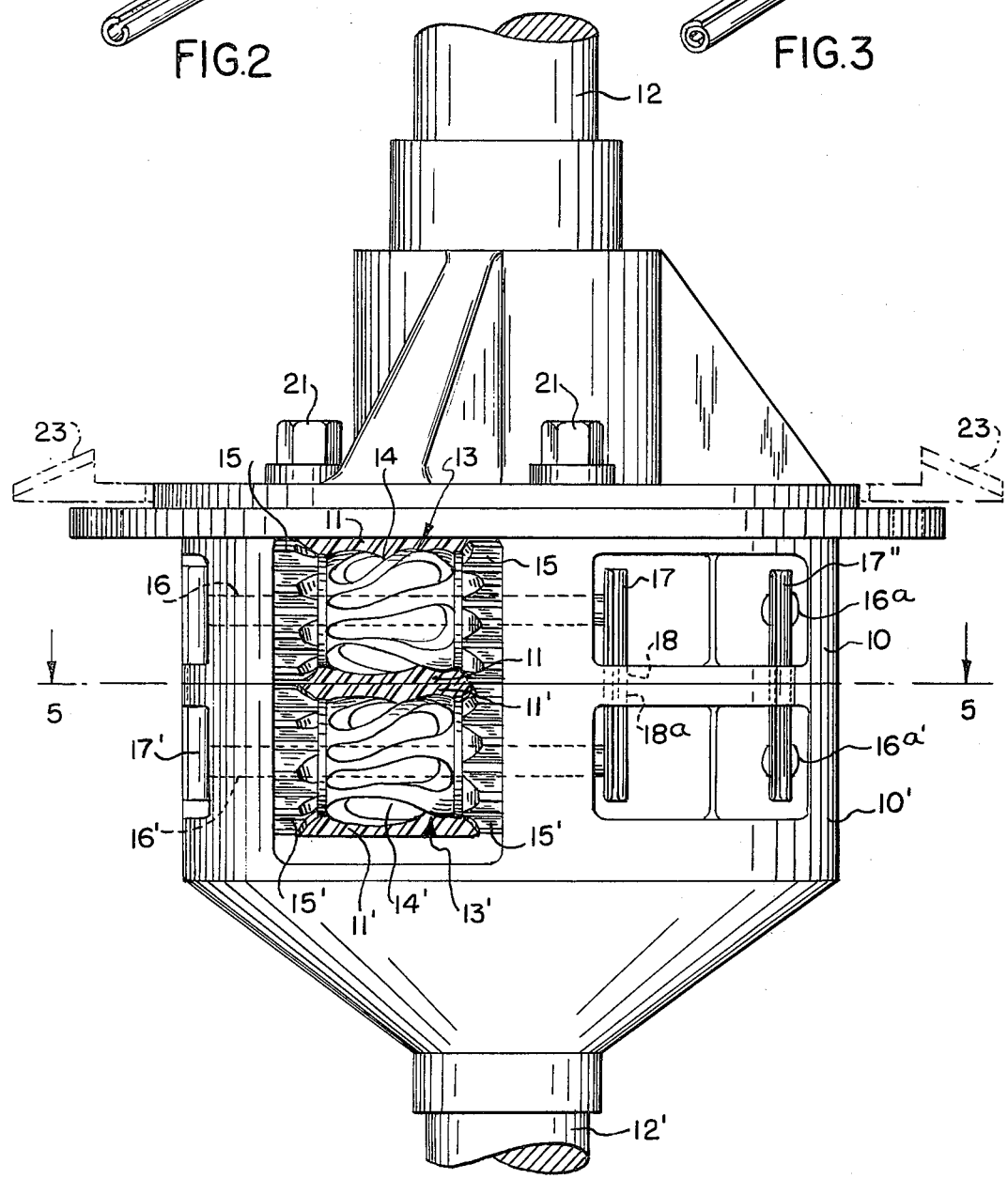

FLOATING JOURNAL PIN IN MULTIPLE GEAR DIFFERENTIAL

An object of the present invention is to provide a pin, which may be a spring pin providing means in a differential case for preventing endwise movement of a shaft about which a transfer gear complex is rotatable, or performing the double function of acting as a dowel pin also when two half case portions of the differential mechanism are assembled.

Other objects and advantages of the present invention will be apparent from the accompanying drawings and description and the essential features thereof will be set forth in the appended claims.

In the drawings,

FIG. 1 is a side elevational view of a differential gear mechanism utilizing a spring pin of the present invention;

FIG. 2 is a perspective view, enlarged, of one of the spring pins seen in FIG. 1;

FIG. 3 is a perspective view, enlarged, showing a modified form of spring pin for use in this invention;

FIG. 5 is a sectional view taken along the line 5—5 of FIG. 4 (and would also represent substantially a top plan view) along the line 5—5 of FIG. 1; while

Figure 4:
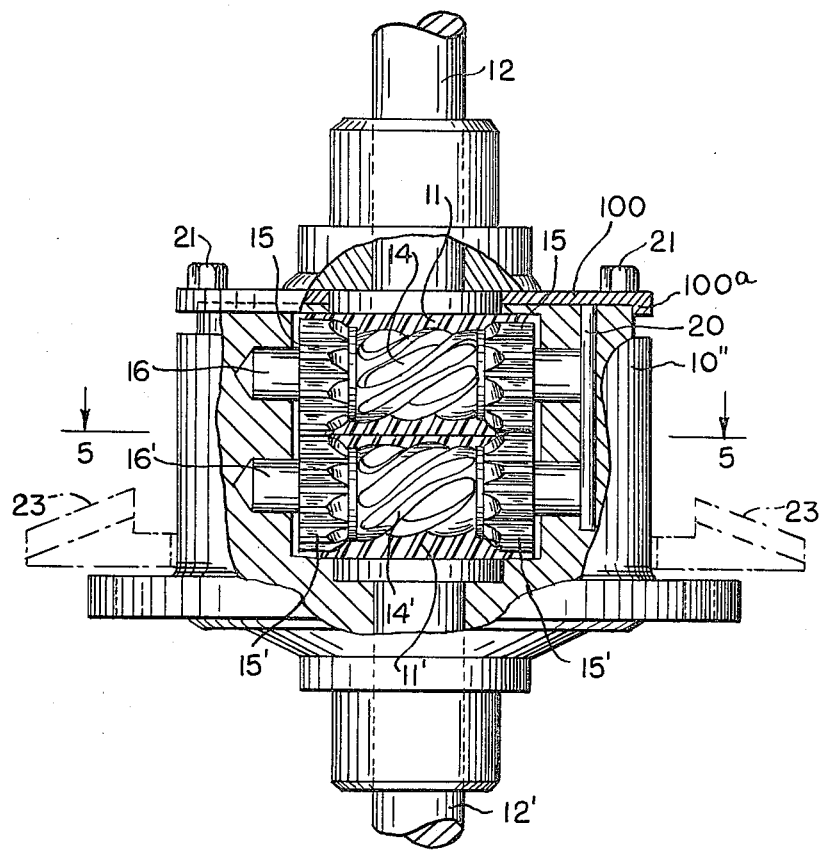
FIG. 4 is a side elevational view of another embodiment of a differential mechanism where the case consists of a single body with a top cover and where the shaft is held by a pin not necessarily having spring characteristics, the pin being held down by the cover.

The copending United States patent application Ser. No. 265,247, filed June 22, 1972 of Robert N. Benjamin for Functional Indexing in Multiple Gear Differential shows a differential mechanism for automotive use and the present invention is shown as adapted for use in this type of differential gear mechanism. Reference may be had to the copending patent application for a better understanding of the differential gear mechanism but sufficient will be disclosed here to illustrate the use of the present invention.

Referring to FIG. 1, a differential mechanism is shown for use with automotive vehicles. This embodiment includes two half case portions 10 and 10' having mutually engaging planar faces and each having centrally thereof a worm traction gear 11 or 11', each adapted to be keyed to a stub shaft 12 or 12' leading to drive wheels on opposite sides of the vehicle. In each half case portion, there is mounted a set of transfer gear complexes 13 and 13', three of these being contemplated in the present invention and located 120° apart. Each transfer gear complex has a worm wheel 14 or 14' located centrally thereof and in mesh with the associated traction gear 11 or 11', as the case may be. On each side of each worm wheel is a reversible balancing gear 15 or 15' which forms a unitary structure with the associated worm wheel 14 or 14'. Each of the gear complexes has a through opening axially thereof with a shaft 16 or 16' extending through the associated through opening and extending endwise therebeyond into case portion 10' at each end, all of these shafts being of the same length. The differential gear half case portions 10 and 10' are assembled with their planar faces engaging each other and with the plural sets of transfer gear complexes of each half portion in registering pairs with similar sets of transfer gear complexes in the other half case portion and with the balancing gears 15 and 15' of the registering pairs meshing with each other. This is all taught in the above-mentioned copending patent application.

One type of the pin of this invention is shown at 17 in FIGS. 1 and 2. This is a known type of spring pin which is generally cylindrical in form having a slit 17a extending longitudinally from end to end. The spring characteristics of this pin hold the slit 17a slightly open when in unstressed condition. Mating openings 18 and 18' are provided in the coacting case portions 10 and 10' adapted to receive and compress a pin 17. Thus, a pin 17 remains in position as shown in FIG. 1 once it has been compressed and placed in restrictive openings 18 and 18'. In FIG. 1, the pin 17 is shown engaging the right-hand ends of the shafts 16 and 16' while another similar spring pin 17' is shown engaging the left-hand ends of the same two shafts. At the right-hand side of FIG. 1, there is shown another spring pin 17'' engaging the end of a shaft 16a or a shaft 16a' in another gear complex just like that already described farther around the circle. Because the shafts 16 and 16' are of the same length and register vertically above each other when the transfer gear complexes are assembled, a single linear pin 17, 17' or 17'' will snugly engage the same end of shafts 16 and 16' as clearly seen at 17 in FIG. 1. The pins 17, 17' and 17'' permit slight endwise movement of shafts 16, 16a and 16a'.

It will be recognized that spring pins such as 17, 17' and 17'' are regularly spaced around the mutually facing surfaces of the gear case half portions 10 and 10' and thus these pins also act as dowel pins in assembling the two half case portions together.

Another type of generally cylindrical spring pin which may be used in place of pin 17 is shown at 19 in FIG. 3. This pin is made by spirally winding a sheet of metal having spring characteristics.

Figure 6:
FIG. 6 is a perspective view of a retaining pin in FIG. 4, not necessarily having spring characteristics.
Figure 5:
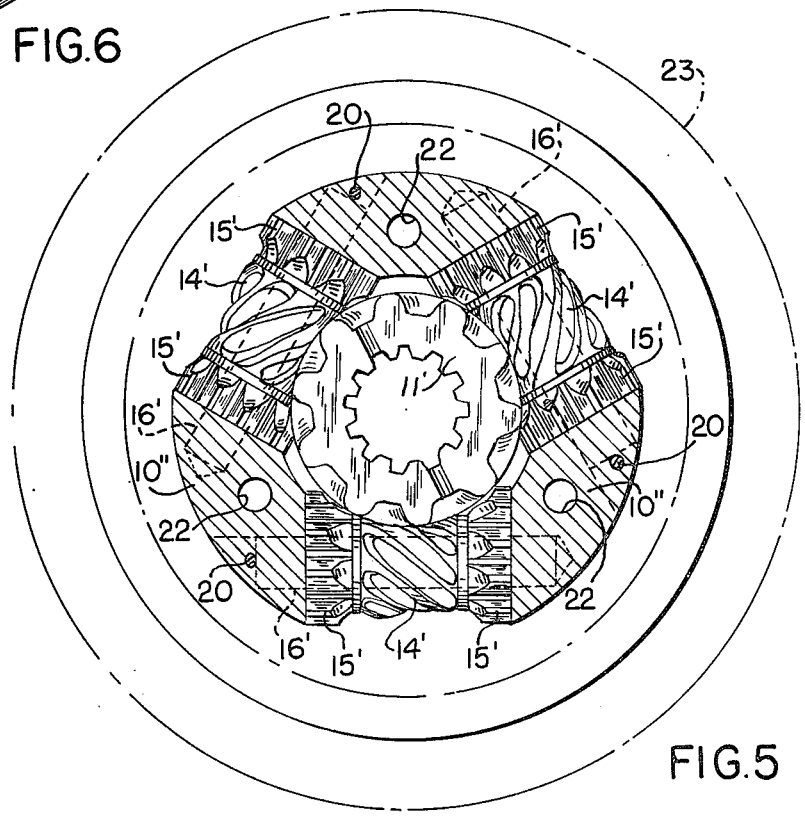

Instead of holding opposite ends of shafts 16 and 16' by spring pins, one end of each shaft may be received in a recess closed endwise while the other end is held by means of a retaining pin 20 as shown in FIGS. 4 and 5. The differential mechanism in FIG. 4 is like that already described in connection with FIG. 1 except that instead of having a two part case, such as 10, 10' in FIG. 1, there is a single case body 10'' in FIG. 4 which is closed by a top cover 100 held in position by bolts 21 which pass through the openings 22 shown in FIG. 5. These are similar to the bolts 21 in FIG. 1 which hold the case portions 10 and 10' assembled. In FIG. 4, the cover 100 has a down turned peripheral ring 100a into which the upward extension of the case 10'' extends. The three pins 20 as clearly seen in FIGS. 4 and 5 act to prevent endwise movement at one end of each of the shafts 16' while the other end of the shaft is retained in a recess in the case 10''. The pins 20 permit slight endwise movement of the shafts 16' as mentioned in connection with the first embodiment. It should be understood that the relationship of the pins 20 with respect to the shafts 16 in the upper part of the case is like that shown in FIG. 5 in the lower part of the case. The pins 20 might be spring pins like 17 in FIG. 2 or 19 in FIG. 3. However, a pin 20 having no spring characteristics might be used as shown in FIG. 6. This could be a rigid cylindrical pin or a rigid tubular pin. As clearly shown in FIG. 4, in this embodiment the cover 100 holds all of the pins 20 in assembled position as shown.

It will be noted in connection with all forms of this invention that the retaining pins 17, 17' and 17" of the first embodiment, or pins 20 in the second embodiment, have a line contact with the end of shaft 16 or 16'. This greatly reduces friction at this point. It will also be understood that in normal use a differential will turn the transfer gear complexes 14, 15 and 14', 15' very slightly and intermittently at spaced time periods. Under such conditions, the lubricant for shafts 16 and 16' may harden up and restrict the rotation either of the shafts where they are embraced in the differential case 10, 10' or 10" or it may restrict the rotation of the transfer gear complexes 14, 15 or 14', 15' with respect to the shafts 16 and 16'. In this situation, the slight end play permitted between the shafts 16 and 16' and the associated retaining pins 17, 17' and 17" in one embodiment or the pins 20 in the other embodiment, will permit some redistribution of the lubricant.

The ring gear shown in dot-dash lines at 23 in FIGS. 1 and 4 represents the usual power input to the differential mechanism as is customary.

What is claimed is:

1. In a differential mechanism, a differential gear case adapted to be driven by a source of power, two substantially identical gear sets assembled in said case, a central worm traction gear in each gear set, a set of transfer gear complexes operatively associated with each of said traction gears, each complex comprising in longitudinal alignment a worm wheel with a reversible balancing gear at each end thereof rotatable with the associated worm wheel, each of said worm wheels in meshing engagement with its associated traction gear, each of said gear complexes having a through opening axially thereof, a shaft extending through each of said through openings and extending endwise therebeyond at each end, all of said shafts being the same length, said traction gears in axial alignment with each other and mounted for rotation in said case independently of the rotation of the case and of each other, said gear sets being assembled in said case with the transfer gear complexes of one gear set in registering pairs with the similar transfer gear complexes of the other gear set and with the said balancing gears in one gear set meshing with the balancing gears of the registering complex in the other gear set; the combination therewith of pin means in said case engaging at least one end of said shafts in each registering pair at the same ends of said shafts and permitting only slight endwise movement of said shafts in at least one direction.

2. A differential mechanism as defined in claim 1, wherein said case comprises two half case portions, said half case portions having mutually engaging planar faces, one of said gear sets in each case portion, each said pin having portions lying in each of said case portions, and there being mating openings in said half case portions at right angles to said planar faces arranged to receive each such pin, whereby said pins also act as dowel pins for holding said half case portions assembled.

3. The combination as defined in claim 1, wherein said pin has spring characteristics and has a slit extending longitudinally from end to end thereof, the spring characteristics of said pin holding said slit slightly open when unstressed.

4. The combination as defined in claim 3, wherein said pin comprises a spirally wound sheet of metal having spring characteristics.

5. The combination as defined in claim 1, wherein said case has a body and a top cover extending to the periphery of said body, and all of said pins extending to the level of the under side of said cover when said differential mechanism is assembled, whereby said cover maintains said pins in proper position.

* * * * *